(12) United States Patent
Shen et al.

(10) Patent No.: US 11,834,587 B2
(45) Date of Patent: Dec. 5, 2023

(54) AQUEOUS COATING COMPOSITIONS

(71) Applicant: Dow Global Technologies LLC, Midland, MI (US)

(72) Inventors: Cheng Shen, Shanghai (CN); Yan Li, Shanghai (CN); Jing Ji, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 203 days.

(21) Appl. No.: 17/285,170

(22) PCT Filed: Oct. 16, 2018

(86) PCT No.: PCT/CN2018/110414
§ 371 (c)(1),
(2) Date: Apr. 14, 2021

(87) PCT Pub. No.: WO2020/077528
PCT Pub. Date: Apr. 23, 2020

(65) Prior Publication Data
US 2021/0380823 A1    Dec. 9, 2021

(51) Int. Cl.
*C08L 71/02*   (2006.01)
*C09D 7/65*    (2018.01)

(52) U.S. Cl.
CPC .............. *C09D 7/65* (2018.01); *C08L 71/02* (2013.01)

(58) Field of Classification Search
CPC .... C09D 7/65; C09D 7/61; C09D 5/14; C08L 71/02; C08K 2003/2241
USPC ........................................................ 524/501
See application file for complete search history.

(56) References Cited

U.S. PATENT DOCUMENTS

| | | |
|---|---|---|
| 4,111,881 A | 9/1978 | Paul |
| 5,319,020 A | 6/1994 | Rosenski et al. |
| 6,759,472 B2 | 7/2004 | Overbeek et al. |
| 6,800,682 B1 | 10/2004 | Windhoevel et al. |
| 7,981,956 B2 | 7/2011 | Gota et al. |
| 8,119,717 B2 | 2/2012 | Anchor et al. |
| 8,936,836 B2 | 1/2015 | Domes et al. |
| 9,815,083 B2 | 11/2017 | Beaudry et al. |
| 9,926,452 B2 | 3/2018 | Jahns et al. |
| 2003/0203991 A1 | 10/2003 | Schottman et al. |
| 2003/0229171 A1* | 12/2003 | Zhao ............. C09D 5/024 524/502 |
| 2008/0119600 A1 | 5/2008 | Anchor et al. |
| 2008/0182929 A1 | 7/2008 | Strepka et al. |
| 2009/0018254 A1 | 1/2009 | Huster et al. |
| 2010/0130644 A1 | 5/2010 | Shah et al. |
| 2012/0258249 A1 | 10/2012 | Adamson et al. |
| 2015/0080512 A1 | 3/2015 | Emelie et al. |
| 2016/0208128 A1 | 7/2016 | Kehrloesser et al. |
| 2018/0051122 A1* | 2/2018 | Sophiea ........... C08G 18/307 |
| 2023/0075575 A1* | 3/2023 | Shen ................. C09D 7/63 |

FOREIGN PATENT DOCUMENTS

| | | |
|---|---|---|
| JP | 2001226415 A | 8/2001 |
| WO | 2007141115 A2 | 12/2007 |
| WO | 2014158661 | 10/2014 |

OTHER PUBLICATIONS

International Search Report & Written Opinion for related PCT Application PCT/CN2018/110414, dated Oct. 16, 2018 (11 pgs).

* cited by examiner

*Primary Examiner* — Hannah J Pak

(74) *Attorney, Agent, or Firm* — Brooks, Cameron & Huebsch, PLLC

(57) ABSTRACT

An aqueous coating compositions including a coalescent represented by Formula I: $R^1\text{—}O\text{—}(A)_n\text{—}R^2$, where $R^1$ is hydrogen, a $C_1$-$C_{12}$ linear aliphatic, or a $C_1$-$C_{12}$ branchedaliphatic, A is an alkylene oxide, $R^2$ is a hydrogen group, a $C_1$-$C_4$ linear aliphatic or branched aliphatic group, a $C_1$-$C_4$ linear or branched carbonyl group, or a benzyl group, and n has an average value from 3 to 25.

8 Claims, No Drawings

AQUEOUS COATING COMPOSITIONS

This application is a National Stage Application under 35 U.S.C. § 371 of International Application Number PCT/CN2018/110414, filed Oct. 16, 2018 and published as WO 2020/077528 on Apr. 23, 2020, the entire contents of which are incorporated herein by reference in its entirety

FIELD OF DISCLOSURE

Embodiments of the present disclosure are directed towards aqueous coating compositions, more specifically, embodiments are directed towards aqueous coating compositions including a coalescent represented by Formula I: $R^1$—O—$(A)_n$—$R^2$, where $R^1$ is hydrogen, a $C_1$-$C_{12}$ linear aliphatic, or a $C_1$-$C_{12}$ branched aliphatic, A is an alkylene oxide, $R^2$ is a hydrogen group, a $C_1$-$C_4$ linear aliphatic or branched aliphatic group, a $C_1$-$C_4$ linear or branched carbonyl group, or a benzyl group, and n has an average value from 3 to 25.

BACKGROUND

Coatings may be utilized for a number of applications including different coating applications such as architectural coating applications, industrial coating applications, automotive coating applications, and outdoor furniture coating applications among others. The continuous pursuit of high performance coatings with low VOC (Volatile Organic Compounds) and/or low odor features continues to drive the development of new coating formulations.

SUMMARY

The present disclosure provides aqueous coating compositions that include a coalescent represented by Formula I: $R^1$—O—$(A)_n$—$R^2$, where $R^1$ is hydrogen, a $C_1$-$C_{12}$ linear aliphatic, or a $C_1$-$C_{12}$ branched aliphatic, A is an alkylene oxide, $R^2$ is a hydrogen group, a $C_1$-$C_4$ linear aliphatic or branched aliphatic group, a $C_1$-$C_4$ linear or branched carbonyl group, or a benzyl group, and n has an average value from 3 to 25.

The present disclosure provides coatings formed with the aqueous coating compositions disclosed herein.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Aqueous coating compositions are disclosed herein. Embodiments of the present disclosure provide that the aqueous coating compositions include a coalescent represented by Formula I: $R^1$—O—$(A)_n$—$R^2$, where $R^1$ is hydrogen, a $C_1$-$C_{12}$ linear aliphatic, or a $C_1$-$C_{12}$ branched aliphatic, A is an alkylene oxide, $R^2$ is a hydrogen group, a $C_1$-$C_4$ linear aliphatic or branched aliphatic group, a $C_1$-$C_4$ linear or branched carbonyl group, or a benzyl group, and n has an average value from 3 to 25.

The aqueous coating compositions disclosed herein can have one or more properties that are desirable for various applications. For instance, the aqueous coating compositions disclosed herein may have an improved, i.e. reduced, minimum film formation temperature as compared to other compositions. Minimum film forming temperature (MFFT) is the lowest temperature at which a composition will uniformly coalesce when laid on a substrate as a thin film. For a number of applications, it is desirable for compositions to have a reduced minimum film formation temperature. Compositions having a reduced minimum film formation temperature may advantageously cure under particular conditions, e.g., lower temperatures, as compared to compositions having a relatively greater minimum film formation temperature.

The aqueous coating compositions disclosed herein may have an improved heat storage stability as compared to other compositions. Heat storage stability may be evidenced by a change in viscosity after storage of a composition for a time interval at an elevated temperate, such as a temperature greater than 20° C. In other words, the aqueous coating compositions disclosed herein may have an improved, i.e. a comparatively lesser change in viscosity, heat storage stability as compared to other compositions. Improved heat storage stability is desirable for a number of applications.

The aqueous coating compositions disclosed herein may have an improved freeze-thaw stability as compared to other compositions. Freeze-thaw stability may be evidenced as a comparatively lesser change in viscosity after number of freezing and thawing cycles. In other words, the aqueous coating compositions disclosed herein may have an improved, i.e. a comparatively lesser change in viscosity, freeze-thaw stability as compared to other compositions. Improved freeze-thaw stability is desirable for a number of applications.

The aqueous coating compositions disclosed herein include a binder. The binder may help to bind together one or more components of the aqueous coating compositions and/or bind one or more components of the aqueous coating compositions to a substrate. The binder may comprise one or more acrylic copolymers, polyurethane, vinyl acetate copolymers, polyurea, wax, casein, egg tempera, gum arabic, linseed oil, shellac, starch glue, gelatin, dextrin, polyester or combinations thereof. "Acrylic", as used herein, includes (meth)acrylic acid, (meth)alkyl acrylate, (meth)acrylamide, (meth)acrylonitrile and their modified forms such as (meth) hydroxyalkyl acrylate.

The binder may comprise monomeric structural units derived from one or more ethylenically unsaturated monomers. Examples of ethylenically unsaturated monomers include, but are not limited to, (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, and hydroxypropyl methacrylate; (meth)acrylonitrile; styrene and substituted styrene; butadiene; ethylene, propylene, 1-decene; vinyl acetate, vinyl butyrate, vinyl versatate and other vinyl esters; vinyl monomers such as vinyl chloride and vinylidene chloride; and combinations thereof.

The ethylenically unsaturated monomer may comprise a functional group. Examples of the functional group include, but are not limited to, carbonyl, acetoacetate, alkoxysilane, carboxyl, ureido, amide, imide, amino group, and combinations thereof. Various functional groups and various concentrations of functional groups may be utilized for different applications.

The binder may comprise a chain transfer agent. Examples of chain transfer agents include, but are not limited to, 3-mercaptopropionic acid, dodecyl mercaptan, methyl 3-mercaptopropionate, benzenethiol, azelaic alkyl mercaptan, and combinations thereof. Various chain transfer agents and various concentrations of chain transfer agent may be utilized for different applications.

One or more embodiments provide that the binder may be in the form of a dispersion or an emulsion, which are herein referred to as a "binder emulsion". The binder emulsion may have a solids content, e.g. the binder, from 30 to 75 weight percent, based upon a total weight of the binder emulsion. All individual values and subranges from 30 to 75 weight percent are included; for example, the binder emulsion may have a solids content from a lower limit of 30, 34, or 40 weight percent to an upper limit of 75, 65, or 60 weight percent, based upon the total weight of the binder emulsion.

The binder, e.g. the binder emulsion, can be formed using known equipment, reaction components, and reaction conditions. For example, the binder can be formed by emulsion polymerization.

The binder, e.g. the binder emulsion, can be obtained commercially. Examples of commercial binders include, but are not limited to, those under the trade name PRIMAL™, such as PRIMAL™ AC-268 and PRIMAL™ AC-261, available from The Dow Chemical Company; those under the trade name ROSHIELD™, such as ROSHIELD™ 3311 and ROSHIELD™ EP-6060, available from The Dow Chemical Company; those under the trade name MAINCOTE™, such as MAINCOTE™ 1100A, available from The Dow Chemical Company; those under the tradename BAYHYDROL, such as BAYHYDROL XP-2557, BAYHYDROL XP-2606, and BAYHYDROL XP-2427 available from Bayer, and combinations thereof, among other commercially available binders.

The aqueous coating composition may include from 5 to 65 weight percent binder solids based upon a total weight of the aqueous coating composition. All individual values and subranges from 5 to 65 weight percent are included; for example, the aqueous coating composition may include binder solids from a lower limit of 5, 10, or 15 weight percent to an upper limit of 65, 60, or 50 weight percent, based upon the total weight of the aqueous coating composition.

As mentioned, the aqueous coating compositions disclosed herein include the coalescent represented by Formula I: $R^1-O-(A)_n-R^2$, where $R^1$ is hydrogen, a $C_1$-$C_{12}$ linear aliphatic, or a $C_1$-$C_4$ branched aliphatic, A is an alkylene oxide, $R^2$ is a hydrogen group, a $C_1$-$C_4$ linear aliphatic or branched aliphatic group, a $C_1$-$C_4$ linear or branched carbonyl group, or a benzyl group, and n has an average value from 3 to 25.

As mentioned, "A" of the coalescent represented by Formula I is an alkylene oxide. Embodiments provide that "A" is monomeric structural units derived from propylene oxide, butylene oxide, or a combination thereof. "Monomeric structural unit", as used herein, indicates a portion of a polymer structure, e.g. "A", that results from a reaction to form the polymer.

One or more embodiments provide that "A" of the coalescent represented by Formula I is a homopolymer. For instance, "A" can be monomeric structural units derived from propylene oxide or butylene oxide. One or more embodiments provide that propylene oxide is not utilized to form "A". One or more embodiments provide that butylene oxide is not utilized to form "A".

One or more embodiments provide that "A" of the coalescent represented by Formula I is a copolymer. For instance, "A" can be monomeric structural units derived from propylene oxide and butylene oxide. The monomeric structural units derived from propylene oxide and butylene oxide may be a block distribution, a random distribution, or a combination thereof In other words, the copolymer can be a block copolymer or a random copolymer.

When "A" is monomeric structural units derived from propylene oxide and butylene oxide, a weight ratio of propylene oxide to butylene oxide from 10:1 to 0.1:1 may be utilized to form "A". All individual values and subranges from 10:1 to 0.1:1 are included; for example, a weight ratio from a lower limit of 0.1:1, 0.5:1, 0.75:1, or 1:1 to an upper limit of 10:1, 7:1, or 5:1 of propylene oxide to butylene oxide may be utilized to form "A".

As mentioned, "n" of the coalescent represented by Formula I is from 3 to 25. All individual values and subranges from 3 to 25 are included; for example, "n" may be from a lower limit of 3, 5, or 7 to an upper limit of 25, 23, or 21.

The coalescent represented by Formula I may have a number average molecular weight from 300 to 1800 g/mol. All individual values and subranges from 300 to 1800 g/mol are included; for example, the coalescent represented by Formula I may have a number average molecular weight from a lower limit of 300, 350, 400, 450, or 500 g/mol to an upper limit of 1800, 1600,1400, or 1200 g/mol.

The aqueous coating composition may include from 0.5 to 15 weight percent of the coalescent represented by Formula I based upon a total weight of the coalescent and the binder solids. An individual values and subranges from 0.5 to 15 weight percent are included; for example, the aqueous coating composition may include the coalescent represented by Formula I from a lower limit of 0.5, 1.0, or 3.0 weight percent to an upper limit of 15, 10, or 8 weight percent based upon a total weight of the coalescent and the binder solids.

The aqueous coating compositions disclosed herein include water. The aqueous coating composition may include from 30 to 90 weight percent water based upon a total weight of the aqueous coating composition. All individual values and subranges from 30 to 90 weight percent are included; for example, the aqueous coating composition may include water from a lower limit of 30, 40, or 50 weight percent to an upper limit of 90, 80, or 70 weight percent water, based upon the total weight of the aqueous coating composition.

The aqueous coating compositions disclosed herein may include a wetting agent, which may also be referred to as a surfactant and/or a dispersant. "Wetting agent" herein refers to a chemical additive that can reduce the surface tension and/or improve separation of particles of the aqueous coating compositions disclosed herein. Examples of wetting agents include, but are not limited to, alcohol ethoxylate wetting agents, polycarboxylate wetting agents, anionic wetting agents, zwitterionic wetting agents, non-ionic wetting agents, and combinations thereof. Specific examples of wetting agents include sodium bis(tridecyl) sulfosuccinate, sodium di(2-ethylhexyl) sulfosuccinate, sodium dihexylsulfosuccinate, sodium dicyclohexylsulfosuccinate, sodium diamylsulfosuccinate, sodium diisobutytsulfosuccinate, disodium iso-decylsulfosuccinate, the disodium ethoxylated alcohol half ester of sulfosuccinic acid, disodium alkylamidopolyethoxy sulfosuccinate, tetra-sodium N-(1,2-dicarboxyethyl)-N-octadecyl sulfosuccinamate, disodium N-octasulfosuccinamate sulfated ethoxylated nonylphenol, and 2-amino-2-methyl-1-propanol, among others. Examples of commercially available wetting agents include, for example, ECOSURF™ EH-9, available from The Dow Chemical Company, OROTAN™ CA-2500, available from The Dow Chemical Company, SUREYNOL 104, available from Evonik, BYK-346 and BYK-349 polyether-modified siloxanes both available from BYK, and AMP-95, available from Golden Gate Capital, among others.

The aqueous coating composition may include from 0.01 to 10 weight percent of the wetting agent based upon a total weight of the aqueous coating composition. All individual values and subranges from 0.01 to 10 weight percent are included; for example, the aqueous coating composition may include the wetting agent from a lower limit of 0.01, 0.1, 0.2, 1.0 or 2.0 weight percent to an upper limit of 10, 8, 7, 5, 4, or 3 weight percent based upon the total weight of the aqueous coating composition.

The aqueous coating compositions disclosed herein may include a freeze-thaw stabilizer. Examples of freeze-thaw stabilizers include alcohols, glycols, and combinations thereof, among others. Specific examples of freeze-thaw stabilizers include ethylene glycol, diethylene glycol, propylene glycol, glycerol (1,2,3-trihydroxypropane), ethanol, methanol, 1-methoxy-2-propanol, 2-amino-2-methyl-1-propanol, tristyrylphenol ethoxylate, and combinations thereof.

The aqueous coating composition may include from 0.1 to 15 weight percent of the freeze-thaw stabilizer based upon a total weight of the aqueous coating composition. All individual values and subranges from 0.1 to 15 weight percent are included; for example, the aqueous coating composition may include the freeze-thaw stabilizer from a lower limit of 0.1, 0.5, or 1.0 weight percent to an upper limit of 15, 10, or 8 weight percent based upon a total weight of the aqueous coating composition.

The aqueous coating compositions disclosed herein may include a colorant, which may be also be referred to as a pigment. Various colorants may be utilized. The colorant can be a natural colorant, a synthetic colorant, an organic colorant, an inorganic colorant, or a combination thereof Specific examples of colorants include titanium dioxide and polymeric pigments, such ROPAQUE™ Ultra E, available from The Dow Chemical Company, among others.

The aqueous coating composition may include from 0.5 to 45 weight percent of the colorant based upon a total weight of the aqueous coating composition. All individual values and subranges from 0.5 to 45 weight percent are included; for example, the aqueous coating composition may include the colorant from a lower limit of 0.5, 1.0, or 5.0 weight percent to an upper limit of 45, 30, or 25 weight percent based upon a total weight of the aqueous coating composition.

The aqueous coating compositions disclosed herein may include a thickener, which may also be referred to as a filler and/or a rheology modifier. Examples of thickeners include, but are not limited to, calcium carbonate, polyvinyl alcohol (PVA), clay materials, such as kaolin, acid derivatives, acid copolymers, urethane associate thickeners (UAT), polyether urea polyurethanes (PEUPU), polyether polyurethanes (PEPU), and combinations thereof, thickeners such as alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose, and combinations thereof may be utilized. Commercial examples include those available under the ACRYSOL™ tradename, such as ACRYSOL™ TT-935, ACRYSOL™ DR-770, and ACRYSOL™ RM-2020 NPR, available from The Dow Chemical Company; and Natrosol 250HBR available from Ashland.

The aqueous coating composition may include from 0.1 to 4 weight percent of the thickener based upon a total weight of the aqueous coating composition. All individual values and subranges from 0.1 to 4 weight percent are included; for example, the aqueous coating composition may include the thickener from a lower limit of 0.1, 0.2, or 0.3 weight percent to an upper limit of 4, 3, or 2 weight percent based upon a total weight of the aqueous coating composition.

The aqueous coating compositions disclosed herein may include a matting agent. The matting agent may include various inorganic particles, organic particles, and combinations thereof, as is known in the art. The matting agent may be a powder. Examples of the matting agent include, but are not limited to, silica matting agents, diatomate, polyurea matting agents, polyacrylate, polyethylene, polytetrafluoroethene, and combinations thereof. Examples of commercial matting agents are commercially available matting agents may include, for example, CILITE 499 available from World Minerals Co. Ltd, ACEMATT TS-100 and ACEMATT OK520 silica matting agents both available from Evonik, DEUTERON MK polyurea matting agent available from Deuteron, and micronized wax additives CERAFLOUR 929 and CERAFLOUR 920 both available from BYK, SYLOID Silica 7000 matting agent available from Grace Davison.

The aqueous coating composition may include from 0.1 to 10 weight percent of the matting agent based upon a total weight of the aqueous coating composition. All individual values and subranges from 0.1 to 10 weight percent are included; for example, the aqueous coating composition may include the matting agent from a lower limit of 0.1, 0.3, or 0.5 weight percent to an upper limit of 10, 8, or 5 weight percent based upon a total weight of the aqueous coating composition.

The aqueous coating compositions disclosed herein may include an additional coating additive, as known in the art. Examples of the additional coating additive include, but are not limited to leveling agents; flow control agents such as silicones, fluorocarbons or cellulosics; extenders; flatting agents; ultraviolet light (UV) absorbers; hindered amine light stabilizers (HALS); phosphites; defoamers and antifoaming agents; anti settling, anti-sag and bodying agents; anti-skinning agents; anti-flooding and anti-floating agents; biocides, fungicides and mildeweides; corrosion inhibitors, and combinations thereof, among others. Various amounts of the additional coating additive may be utilized for different applications.

The aqueous coating composition may include from 0.1 to 10 weight percent of the additional coating additive based upon a total weight of the aqueous coating composition. All individual values and subranges from 0.1 to 10 weight percent are included; for example, the aqueous coating composition may include the additional coating additive from a lower limit of 0.1, 0.15, or 0.2 weight percent to an upper limit of 10, 9, or 8 weight percent based upon a total weight of the aqueous coating composition.

The aqueous coating compositions disclosed herein may be formed by a known process; the aqueous coating compositions may be made using known equipment and reaction conditions.

For instance, forming the aqueous coating compositions can include a grind stage. For the grind stage, a number of components of the aqueous coating composition, such as the pigment, as well as other materials that may not homogenize under low-shear mixing and/or are selected for a particle size reduction, can be combined with water to be ground and/or dispersed, e.g. via a mill under high shear conditions. Other components, such as defamer and/or wetting agent, among others, may be utilized in the grind stage.

The grind stage can provide that resultant particles have an average particle diameter from 0.1 μm to 100 μm. All individual values and subranges from 0.1 μm to 100 μm are included; for example, resultant particles may have an average particle diameter from a lower limit of 0.1, 0.5, or 1.0 μm to an upper limit of 100, 75, or 50 μm.

Following the grind stage, a let-down stage may be performed. Output resultant from the grind stage, e.g., a number of ground and/or dispersed aqueous coating composition components, can be combined with the remaining components utilized to form the aqueous coating composition. The let-down stage may utilize low shear mixing, for instance.

The aqueous coating composition disclosed herein can be utilized to form coatings. These coatings may be used for a number of different coating applications such as industrial coating applications, architectural coating applications, automotive coating applications, outdoor furniture coating applications, among others.

The aqueous coating composition disclosed herein may be applied to a substrate, e.g., to one or more surfaces of an article or a structure, via any method. Such methods include, but are not limited to, spraying, dipping, rolling, and any other conventional technique generally known to those skilled in the art. The surface of such structures to be coated with the aqueous coating composition may comprise concrete, wood, metal, plastic, glass, drywall, among others. Known equipment, components, and conditions may be utilized when applying the aqueous coating compositions.

Following application to the substrate, the aqueous coating composition can be cured, e.g. dried, to form a coating. The coatings can form one or more layers having various thicknesses for different applications.

Advantageously, the coatings disclosed herein can have one or more properties that are desirable for various applications. For instance, the coatings disclosed herein may have an improved scrub resistance as compared to coatings formed from other compositions, e.g., when the coatings are dried within a particular temperature range. For instance, the coatings disclosed herein may have an improved scrub resistance when dried at a temperature at or below 15° C., e.g., from −25 to 15° C., or −20 to 10° C. As used herein, the term "scrub resistance" refers to a number of scrub cycles required to erode a coating from the substrate. Scrub resistance can be determined according to GB/T 9266-2009.

Further, the coatings disclosed herein may have an improved i.e., greater, long term hardness development as compared to coatings formed from other compositions. For examples, the coatings disclosed herein may have an improved hardness development at 96 hours, e.g., when hardness of the coating is determined 96 hours from application of the coating, 168 hours, and 240 hours. Providing improved long term hardness development is advantageous for a number of applications.

EXAMPLES

In the Examples, various terms and designations for materials are used including, for instance, the following: ECOSURF™ EH-9 (alcohol alkoxylate wetting agent, obtained from The Dow Chemical Company); propylene glycol (freeze-thaw stabilizer, obtained from SinoPharma Co. Ltd); BYK-024 (defoamer, obtained from BYK); AMP-95 (pH adjuster/dispersant, obtained from Golden Gate Capital); OROTAN™ CA-2500 (dispersant, obtained from The Dow Chemical Company); ROCIMA™ CF-1100 (biocide, obtained from The Dow Chemical Company); Natrosol 250HBR (thickener, obtained from Ashland); titanium dioxide (colorant); matting agent (Acematt TS-100, obtained from Evonik); calcined kaolin DB-80 (filler); calcium carbonate CC-700 (tiller); PRIMAL™ AC-268 (binder, obtained from The Dow Chemical Company); ROPAQUE™ Ultra E (polymeric pigment, opaque polymer, obtained from The Dow Chemical Company); ACRYSOL™ TT-935 (thickener, obtained from The Dow Chemical Company); ACRYSOL™ DR-770 (thickener, obtained from The Dow Chemical Company); KATHON™ LXE (biocide, obtained from The Dow Chemical Company); ACRYSOL™ RM-2020 NPR (rheology modifier, obtained from The Dow Chemical Company); UCAR™ FILMER IBT (commercial coalescent, obtained from The Dow Chemical Company); Optifilm Enhancer OE-400 (commercial coalescent, obtained from Eastman).

Butylene oxide and propylene oxide were alkoxylated to provide the coalescent represented by Formula I:

$$R^1-O-(A)_n-R^2$$

Where $R^1$ was linear $C_4$ aliphatic, $R^2$ was a hydrogen group, A was monomeric structural units derived from propylene oxide and butylene oxide, and n had an average value of 9. The coalescent had a number average molecular weight of 665 g/mol, as determined by hydroxyl value measurement. This coalescent was prepared based on the commercial product DOWANOL™ TPnB ($C_4$-$(PO)_3$, available from The Dow Chemical Company), followed with an additional step of butoxylation under known alkoxylation conditions utilizing KOH as catalyst. $C_4$-$(PO)_3$ was added to the reactor with KOH (active weight at 6000 ppm, aq. soln. at a concentration of 50% wt.); the reactor was closed and the contents were stirred at 250 rpm and heated to 80°C. Vacuum was applied as the contents of the reactor were maintained at 80° C. to remove the residue water from the reactor. Then, the contents of the reactor were heated to 120° C. and butylene oxide was added into the reactor slowly while maintaining the pressure in the reactor less than 4.5 bar. Following addition of the butylene oxide, the contents of the reactor were maintained at 120° C. for digestion; the pressure of the reactor was monitored until the pressure was close to the initial pressure (before BO addition) and stable for 2 hours. Then, the reactor was purged three times with nitrogen and vacuum to remove any residual butylene oxide. Then, the contents of the reactor were cooled to 60° C. and neutralized it with acetic acid to provide the coalescent represented by Formula I.

Minimum film formation temperature (MFFT) was determined as follows. Sample 1 and Sample 2, which each contained the coalescent represented by Formula I. Comparative Sample A, and Comparative Sample B were prepared as follows. Varying amounts of the coalescent represented by Formula I and PRIMAL™ DC-420 were combined to respectively provide Samples 1-2; UCAR™ FILMER IBT and PRIMAL™ DC-420 were combined to Comparative Sample A; and Optifilm Enhancer OE-400 and PRIMAL™ DC-420 were combined to Comparative Sample B.

Each of Samples 1-2 and Comparative Samples A-B were stored at approximately 20° C. for 24 hours; then each was respectively applied to plastic film of a RHOPOINT MFFT-90 instrument with 75 μm wet film. After 2 hours the film appearance was observed and the temperature at which the films cracked was determined. A sample of clean PRIMAL™ DC-420 was utilized to determine the baseline MFFT of 33° C. The results are reported in Tables 1 and 2.

TABLE 1

| | Minimum film formation temperature |
|---|---|
| Sample 1 (3 weight percent of the coalescent represented by Formula I based upon a total weight of the coalescent and the binder solids) | 14.0° C. |
| Comparative Sample A (3 weight percent of UCAR ™ FILMER IBT solids based upon a total weight of the UCAR ™ FILMER IBT solids and the binder solids) | 14.8° C. |
| Comparative Sample B (3 weight percent of Optifilm Enhancer OE-400 solids based upon a total weight |  14.8° C. |

TABLE 1-continued

| | Minimum film formation temperature |
|---|---|
| of the Optifilm Enhancer OE-400 solids and the binder solids) | |

The data of Table 1 illustrates that at 3 weight percent loadings, Sample 1 has an improved, i.e. reduced, minimum film formation temperature as compared to each of Comparative Examples A and B. The reduced minimum film formation temperature provided by Sample 1 illustrates that aqueous coating compositions including a binder and the coalescent represented by Formula I will likewise have an improved, i.e. reduced, minimum film formation temperature as compared to other compositions.

TABLE 2

| | Minimum film formation temperature |
|---|---|
| Sample 2 (5 weight percent of the coalescent represented by Formula I based upon a total weight of the coalescent and the binder solids) | 3.8° C. |
| Comparative Sample A (5 weight percent of UCAR ™ FILMER IBT solids based upon a total weight of the UCAR ™ FILMER IBT solids and the binder solids) | 4.0° C. |

The data of Table 2 illustrates that at 5 weight percent loadings, Sample 2 has an improved, i.e. lower, minimum film formation temperature as compared to Comparative Sample A. The reduced minimum film formation temperature provided by Sample 2 illustrates that aqueous coating compositions including a binder and the coalescent represented by Formula I will likewise have an improved, i.e. reduced, minimum film formation temperature as compared to other compositions.

Example 1, an aqueous coating composition, was formed as follows. Deionized water (165 grams), propylene glycol (12 grams), OROTAN™ CA-2500 (7.5 grams), ECO-SURF™ EH-9 (1.5 grams), and BYK-024 (1.0 grams) were added to a container and mixed by dispersion plate at approximately 400 rpm for 2 minutes. Natrosol 250HBR (1.5 grams) was added to the contents of the container, which were mixed at approximately 400 rpm for 2 minutes. AMP-95 (1.5 grams) was added to the contents of the container, which were mixed at approximately 400 rpm for 10 minutes. Titanium dioxide (200 grams), calcined kaolin DB-80 (35 grams), calcium carbonate CC-700 (50 grams), and matting agent (35 grams) were added to the contents of the container, which were mixed at approximately 2000 rpm for 30 minutes to provide that the particles of the contents of the container had a size less than or equal to 50 μm; a viscosity increase was observed. Then PRIMAL™ AC-268 (280 grams), BYK-024 (1 gram), and KATHON™ LXE (2 grams) were added to the contents of the container, which were mixed at approximately 1800 rpm for 10 minutes. Then AMP-95 (0.5 grams), IROPAQUE™ Ultra E (70 grams), ACRYSOL™ TT-935 (3.5 grams), ACRYSOL™ DR-770 (5 grams), ACRYSOL™ RM-2020 NPR (10 grams), and deionized water (100.5 grams) were added to the contents of the container, which were mixed at approximately 300 rpm for 10 minutes. The contents of the container were divided to three equal portions; the coalescent represented by Formula I (4 weight percent of the coalescent represented by Formula I based upon a total weight of the coalescent and the binder solids) was added to the first portion to provide Example 1.

Comparative Example A was formed as Example 1, with the change that UCAR™ FILMER IBT was utilized rather than the coalescent represented by Formula I; weight percents of the UCAR™ FILMER IBT solids based upon a total weight of the UCAR™ FILMER IBT solids and the water are indicated below.

Comparative Example B was formed as Example 1, with the change that Optifilm Enhancer OE-400 solids was utilized rather than the coalescent represented by Formula I; weight percents of the Optifilm Enhancer OE-400 solids based upon a total weight of the Optifilm Enhancer OE-400 and the water are indicated below.

Heat storage stability was determined according to GB/T 20623-2006. Example 2 (200 grams), Comparative Example A (200 grams), and Comparative Example B (200 grams) were sealed in respective containers and placed in an oven (50±2° C.) for 14 days; then the respective containers were maintained at 23±2° C. for 3 hours; then the respective viscosities were measured utilizing a Stormer viscometer. The results are reported in Table 3.

TABLE 3

| | Initial Viscosity (Krebs units) | Viscosity after 14 days at 50° C. (Krebs units) | Change in viscosity (Krebs units) |
|---|---|---|---|
| Example 1 (4 weight percent of the coalescent represented by Formula 1 based upon a total weight of the coalescent and the binder solids) | 100.3 | 121.8 | 20.8 |
| Comparative Example A (4 weight percent of UCAR ™ FILMER IBT solids based upon a total weight of the UCAR ™ FILMER IBT solids and the binder solids) | 104.1 | 135.0 | 30.9 |
| Comparative Example B (5.5 weight percent of Optifilm Enhancer OE-400 solids based upon a total weight of the Optifilm Enhancer OE-400 solids and the binder solids) | 108.0 | Excessively viscous | Became excessively viscous |

The data of Table 3 illustrates that Example 1 has an improved heat storage stability, as evidenced by a comparatively lesser change in viscosity, as compared to both Comparative Example A and Comparative Example B, which became too excessively viscous for viscosity determination.

Freeze-thaw stability was determined according to GB/T 20623-2006. Example 1 (200 grams), Comparative Example A (200 grams), and Comparative Example B (200 grams) were sealed in respective containers and placed in a refrigerator (−5±2° C.) for 18 hours; then the respective containers were maintained at room temperature for 6 hours; this cycle was repeated 3 times. Then the respective viscosities were measured utilizing a Stormer viscometer. Two additional cycles, as described, were then performed and the respective viscosities were again measured. The results are reported in Table 4.

TABLE 4

| | Example 1 (4 weight percent of the coalescent represented by Formula I based upon a total weight of the coalescent and the binder solids) | Comparative Example A (4 weight percent of UCAR ™ FILMER IBT solids based upon a total weight of the UCAR ™ FILMER IBT solids and the binder solids) | Comparative Example B (5.5 weight percent of Optifilm Enhancer OE-400 solids based upon a total weight of the Optifilm Enhancer OE-400 solids and the binder solids) |
|---|---|---|---|
| Initial Viscosity (Krebs units) | 100.3 | 104.1 | 108.0 |
| Viscosity after 3 cycles at −6° C. (Krebs units) | 102.5 | 109.4 | 113.4 |
| Change in viscosity after 3 cycles at −6° C. (Krebs units) | 2.2 | 5.3 | 5.4 |
| Viscosity after 5 cycles at −6° C. (Krebs units) | 102.8 | 112.1 | 118.2 |
| Change in viscosity after 5 cycles at −6° C. (Krebs units) | 2.5 | 8.0 | 10.2 |

The data of Table 4 illustrates that Example 1 has an improved freeze-thaw stability, as evidenced by a comparatively lesser change in viscosity, as compared to both Comparative Example A and Comparative Example B after 3 cycles of freezing at −6° C. and thawing. The data of Table 4 illustrates that Example 1 has an improved freeze-thaw stability, as evidenced by a comparatively lesser change in viscosity, as compared to both Comparative Example A and Comparative Example B after 5 cycles of freezing at −6° C. and thawing.

Scrubbing resistance was determined according to GB/T 9266-2009. Example 1 was painted on two sets non-asbestos fiber cement plates with a thickness of 100 μm; then, the first set of plates were dried for 7 days at 5° C. and the second set of plates were dried for 7 days at 20° C. to provide Example 2, a coating. Comparative Examples C-D were formed as Example 2, with the changes that Comparative Examples A-B were respectively used rather than Example 1. The brusher was pre-treated according to GB/T 9266-2009. The scrubbing test was performed with visual check of the coating layers after a given scrubbing times or stopped until the disappearance of the coating layers. In part of the scrubbing test, for those coating plates dried at room temperature for 7 days, specific scrubbing medium was added (10 g per 400 scrubs) to accelerate the test. The results are reported in Table 5.

The data of Table 5 illustrates that Example 2, the coating formed from Example 1, has an improved scrub resistance, as evidenced by a comparatively greater number of scrubs, as compared to the coatings Comparative Example C and Comparative Example D, for coatings dried at 5° C.

The data of Table 5 also illustrates that Example 2, the coating formed from Example 1, has an improved scrub resistance, as evidenced by a comparatively greater number of scrubs, as compared to the coatings Comparative Example D and a comparative scrub resistance to the coating Comparative Example C, for coatings dried at room temperature.

Hardness development was determined as follows. Example 1 was utilized to form Example 3, a coating; Comparative Example B was utilized to form Comparative Example E a coating. Koenig hardness values at various cure times were determined according to ASTM D2134-95. The results are reported in Table 6.

TABLE 5

| | Example 2 (Coating from aqueous composition having 4 weight percent of the coalescent represented by Formula I based upon a total weight of the coalescent and the binder solids) | Comparative Example C (coating from composition having 4 weight percent of UCAR ™ FILMER IBT solids based upon a total weight of the UCAR ™ FILMER IBT solids and the binder solids) | Comparative Example D (coating from composition having 5.5 weight percent of Optifilm Enhancer OE-400 solids based upon a total weight of the Optifilm Enhancer OE-400 solids and the binder solids) |
|---|---|---|---|
| Coatings dried for 7 days at 5° C. | 4862 scrubs | 3499 scrubs | 1340 scrubs |
| Coatings dried for 7 days at room temperature | 476 scrubs | 483 scrubs | 322 scrubs |

TABLE 6

| | Example 3 (Coating from aqueous composition having 4 weight percent of the coalescent represented by Formula I based upon a total weight of the coalescent and the binder solids) | Comparative Example E (coating from composition having 5.5 weight percent of Optifilm Enhancer OE-400 solids based upon a total weight of the Optifilm Enhancer OE-400 solids and the binder solids) |
|---|---|---|
| Koenig hardness at 24 hours (seconds) | 30.0 | 28.0 |
| Koenig hardness at 48 hours (seconds) | 31.0 | 31.0 |
| Koenig hardness at 72 hours (seconds) | 30.5 | 30.5 |
| Koenig hardness at 96 hours (seconds) | 32.0 | 31.0 |
| Koenig hardness at 168 hours (seconds) | 35.0 | 32.0 |
| Koenig hardness at 240 hours (seconds) | 37.0 | 33.0 |

The data of Table 6 illustrates that Example 3, the coating formed from Example 1, has an improved, i.e., greater, hardness development as compared to the coating Comparative Example E for curing time of 96 hours and greater. Having this improved long term, e.g., of 96 hours and greater, is advantageous a number of applications.

The data of Table 6 also illustrates that Example 3, the coating formed from Example 1, has comparable hardness development as compared to the coatings Comparative Example E for curing times equal to and less than 72 hours.

What is claimed is:

1. An aqueous coating composition comprising:
   a binder;
   a coalescent represented by Formula I: $R^1-O-(A)_n-R^2$, where $R^1$ is a $C_1$-$C_{12}$ linear aliphatic, or a $C_1$-$C_{12}$ branched aliphatic, A is an alkylene oxide, $R^2$ is a hydrogen group, or a $C_1$-$C_4$ linear aliphatic or branched aliphatic group, and n has an average value from 7 to 25; and
   water.

2. The aqueous coating composition of claim 1, wherein A is a homopolymer comprising monomeric structural units derived from propylene oxide or butylene oxide.

3. The aqueous coating composition of claim 1, wherein A is a copolymer comprising monomeric structural units derived from propylene oxide and butylene oxide.

4. The aqueous coating composition of claim 1, wherein the coalescent has a number average molecular weight from 300 to 1800 g/mol.

5. The aqueous coating composition of claim 1, wherein the aqueous coating composition includes 5 to 65 weight percent binder solids based upon a total weight of the aqueous coating composition.

6. The aqueous coating composition of claim 5, wherein the aqueous coating composition includes 0.5 to 15 weight percent of the coalescent represented by Formula I based upon a total weight of the coalescent and the binder solids.

7. The aqueous coating composition of claim 1, wherein the aqueous coating composition further includes a freeze-thaw stabilizer, wherein the freeze-thaw stabilizer is from 0.1 to 15 weight percent of the aqueous coating composition based upon a total weight of the aqueous coating composition.

8. A coating formed from the aqueous coating composition of claim 1.

* * * * *